United States Patent [19]
Lin

[11] Patent Number: 5,541,772
[45] Date of Patent: Jul. 30, 1996

[54] CAMERA ZOOM LENS

[75] Inventor: Chieh-Yu Lin, Chung-Ho, Taiwan

[73] Assignee: Industrial Technology Research Institute, Hsinchu Hsien, Taiwan

[21] Appl. No.: 163,480

[22] Filed: Dec. 7, 1993

[51] Int. Cl.$^6$ .............................. G02B 15/14; G02B 3/02
[52] U.S. Cl. ............................................. 359/692; 359/714
[58] Field of Search ...................................... 359/692, 714

[56] References Cited

U.S. PATENT DOCUMENTS

| | | | |
|---|---|---|---|
| 4,682,860 | 7/1987 | Tanaka et al. | 359/692 |
| 4,772,106 | 9/1988 | Ogata et al. | 359/692 |
| 4,818,081 | 4/1989 | Ito | 359/692 |
| 4,830,476 | 5/1989 | Aoki | 359/692 |
| 4,838,669 | 6/1989 | Ogata et al. | 359/692 |
| 4,991,945 | 2/1991 | Estelle | 359/692 |
| 5,270,867 | 12/1993 | Estelle | 359/692 |
| 5,386,321 | 1/1995 | Kawamura | 359/692 |
| 5,412,508 | 5/1995 | Lin | 359/692 |

FOREIGN PATENT DOCUMENTS

5113537  5/1993  Japan ........................ 359/692

*Primary Examiner*—Georgia Y. Epps
*Assistant Examiner*—Evelyn A. Lester
*Attorney, Agent, or Firm*—W. Wayne Liauh

[57] ABSTRACT

A camera zoom lens consists of five lens elements arranged in two groups, in which the first three elements form a front lens group with a positive refractive power and the last two elements form a rear lens group with a negative refracting power. In the lens system, the front lens group is composed of a negative first lens element having its concave surface directed toward the object side of the lens system, a negative second lens element, and a positive third lens element; the rear lens group consists of a positive fourth lens element having its concave surface directed toward the object side of the lens system and a negative fifth lens element having its concave surface directed toward the object side of the lens system. The zoom lens system is suitable for use in a 35 mm lens shutter camera.

10 Claims, 13 Drawing Sheets

CAMERA ZOOM LENS

BACKGROUND OF THE INVENTION

The present invention relates to a zoom lens system, and more particularly to a compact zoom lens system suitable for use in a 35 mm lens shutter camera. The zoom lens system comprises only five lens elements.

Generally, the zoom lens systems fall into two categories. The first category includes the retrofocus type zoom lens system, which typically comprises a front lens group having a negative refractive power and a rear lens group having a positive refractive power. An airspace is reserved between the front lens group and the rear lens group, and it is possible to effectuate variation of focal length of the lens system by varying the airspace. Such a zoom lens system has characteristics which enable reservation of enough space for arranging a mirror. Consequently, the first type of zoom lens system is suitable for use in the well-known single lens reflex camera. However, it has disadvantages in that the front lens group of such a lens system has a large diameter and long total length, and these disadvantages make it impossible to make the zoom lens system compact.

The second category of the zoom lens system is the telephoto system, which typically comprises a front lens group having a positive refractive power and a rear lens group having a negative refractive power. An airspace is also reserved between the front lens group and the rear lens group for zooming. This type of zoom lens system has a shorter back focal length and therefore allows the total length of the zoom lens system to be shortened, it is especially suitable for use in lens shutter cameras.

To overcome the problems above, various prior art compact zoom lens systems have been developed in this field. For example, U.S. Pat. No. 4,772,106 discloses a compact zoom lens system which is comprised of a first lens group having a positive refractive power and a second lens group having a negative refractive power in the order from the object side. The first lens group of such a lens system comprises at least two positive lenses and at least one negative lens, and the second lens group comprises a positive lens and a negative lens.

U.S. Pat. No. 4,818,081 discloses a lens system which employs a two group type configuration composed of a first lens group having a positive focal length and a second lens group having a negative focal length.

U.S. Pat. No. 4,830,476 discloses a compact zoom lens system comprising four lens elements in the lens unit. The front lens group of the zoom lens system comprises a negative lens element and a positive lens element, and the rear lens group comprises a positive lens element and a negative lens element.

U.S. Pat. No. 4,838,669 discloses a zoom lens system which has a positive refractive power and a rear lens group with a front lens group which has a negative refractive power. The front lens group of the lens system comprises a positive meniscus lens, a negative lens and at least one positive lens, and the rear lens group consists of a positive lens, a biconcave lens and a negative meniscus lens.

U.S. Pat. No. 4,682,860 discloses a zoom lens system which is comprised of a front lens groups having a positive refractive power and a rear lens group having a negative refractive power. The first lens group includes at least two positive lens elements and at least one negative lens element; the second lens group includes at least one positive lens element and at least one negative lens element. It is noted that the fourth embodiment as shown in FIG. 9A and 9B of the '860 patent comprises five lens elements forming a zoom lens system. However, the lens system disclosed in the '860 patent contains lens elements with relatively steep radii of curvature and thus is relatively costly to manufacture.

U.S. Pat. No. 4,991,945 discloses a zoom lens system comprising five lens elements. The first three elements form a positive lens group and the last two elements form a negative lens group. All of the lens elements in this prior patent are spherical and the optical condition/parameters such as radii of curvature of lens elements are different from the present invention.

SUMMARY OF THE INVENTION

The primary objective of the present invention is to provide a miniature zoom lens system suitable for use in the lens shutter camera. The zoom lens system in accordance with the present invention, consists of only five lens elements arranged in two lens groups. Counting from the object side, the first three elements form a positive front lens group and the last two elements form a negative rear lens group. An airspace reserved between the front lens group and the rear lens group is made variable to effect zooming. Further, the front lens group and the rear lens group comprises at least one aspheric lens element therein to form a novelty zoom lens system with characteristics of high focal ratio from 35 to 70 and a small outside diameter.

The other objects and features of the invention will become more apparent from the following description taken in connection with the accompanying drawings.

DETAILED DESCRIPTION OF THE INVENTION

Figure 1:
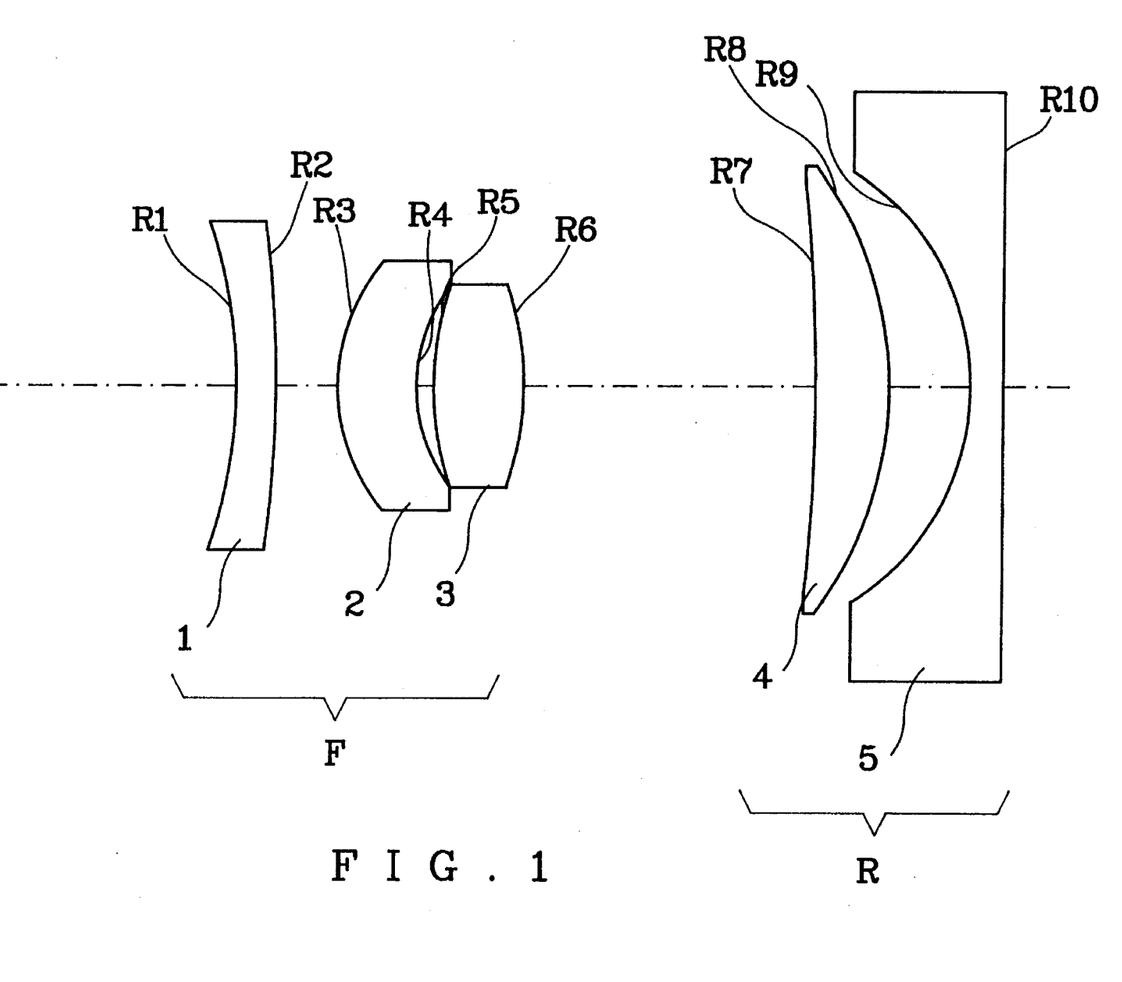
FIG. 1 shows a schematic view illustrating a zoom lens system in accordance with the present invention.

Referring now to FIG. 1, a schematic view is shown illustrating a zoom lens system of the present invention, which is composed of five lens elements 1, 2, 3, 4, and 5 forming an optical lens system. In the order from the object side to the image side, the first three lens elements 1, 2, and 3 form a positive front lens group F and the last two lens elements 4 and 5 form a negative rear lens group R. An airspace SP is reserved between the front lens group F and the rear lens group R, and the airspace is made variable to effect zooming operation. The front lens group has a positive refractive power while the rear lens group has a negative refractive power.

This invention is a miniature zoom lens system composed of five lens elements, which is suitable for use in a 35 mm lens shutter camera. Counting from the object side to the image side along the optical axis of the lens systems as shown in FIG. 1, the reference numerals R1 and R2 represent the lens surface of the first lens element 1; the reference numerals R3 and R4 represent the lens surface of the second lens element 2; the reference numerals R5 and R6 represent the lens surface of the third lens element 3; the reference numerals R7 and R8 represent the lens surface of the fourth lens element 4; and the reference numerals R9 and R10 represent the lens surface of the fourth lens element 5.

In the front lens group F, the first lens element 1 is a negative lens element whose concave surface is arranged to the object side of the lens system. The second lens elements 2 in the front lens group F is a negative lens element. The third lens elements 3 is a positive lens element.

In the rear lens group R, the fourth lens element 4 is a positive lens whose concave surface is arranged to the object side of the lens system. The fifth lens element 5 is a negative lens whose concave surface is arranged to the object side of the lens system.

The following are two preferred embodiments of the invention.

First Embodiment

Figure 2:
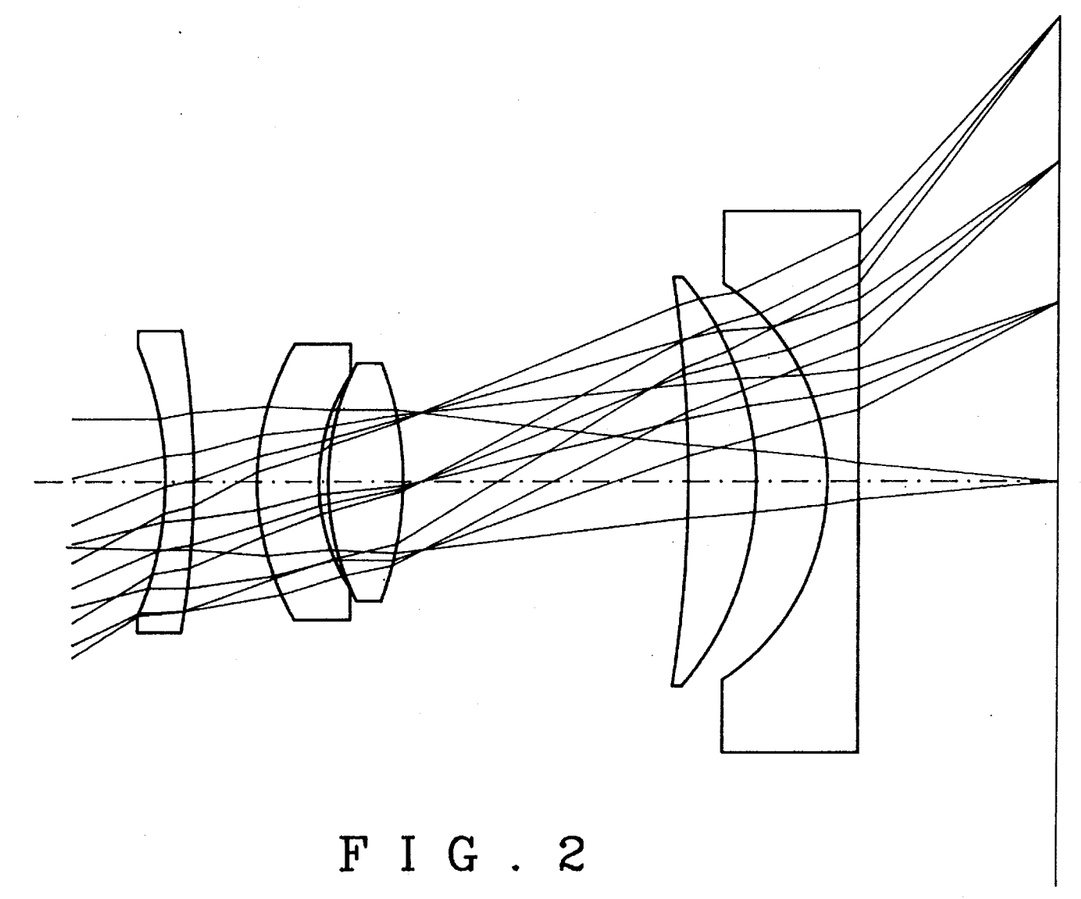
FIG. 2 is a schematic view illustrating refraction of rays through the leans system of the first embodiment of the present invention in wide-angle position.
Figure 2A:
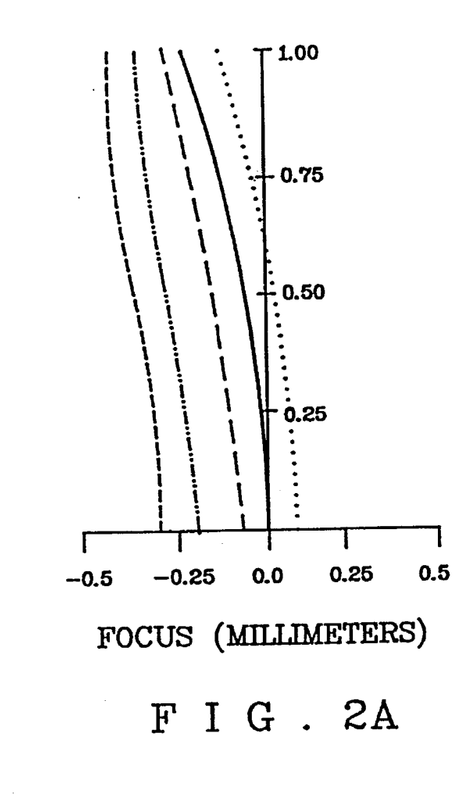
FIG. 2A shows the various longitudinal spherical aberrations of the lens system of FIG. 2.
Figure 2B:
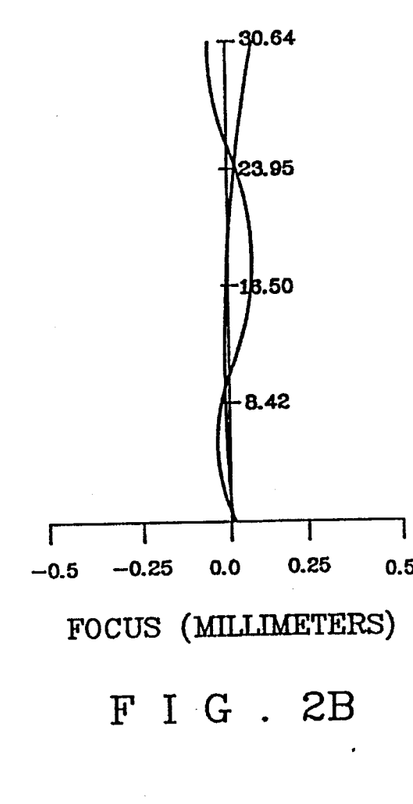
FIG. 2B shows the astigmatism and the field curvature of the lens system of FIG. 2.
Figure 2C:
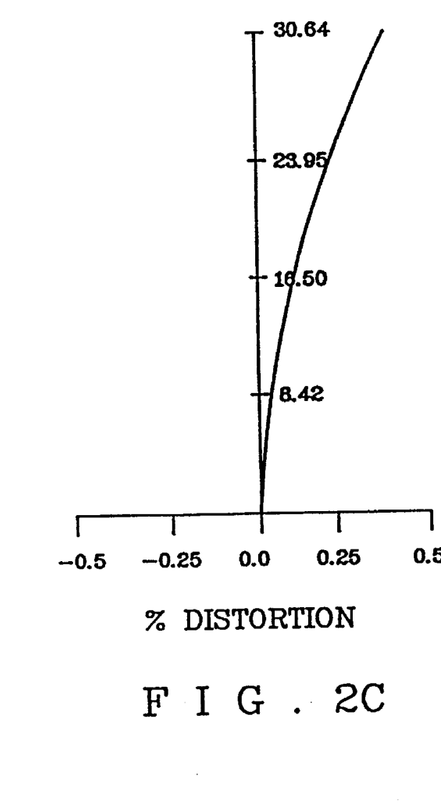
FIG. 2C shows the distortion of the lens system of FIG. 2.

FIG. 2 is a schematic view illustrating refraction of rays through the lens elements from the object side to the image side of the lens systems of the present invention in wide-angle mode of operation. FIGS. 2A through 2C show the various aberrations of the lens system of FIG. 2 in wide-angle position. FIG. 2A shows the longitudinal spherical aberrations of the lens system. FIG. 2B shows the astigmatism and the field curvature of the lens system. FIG. 2C shows the distortion of the lens system.

Figure 3:
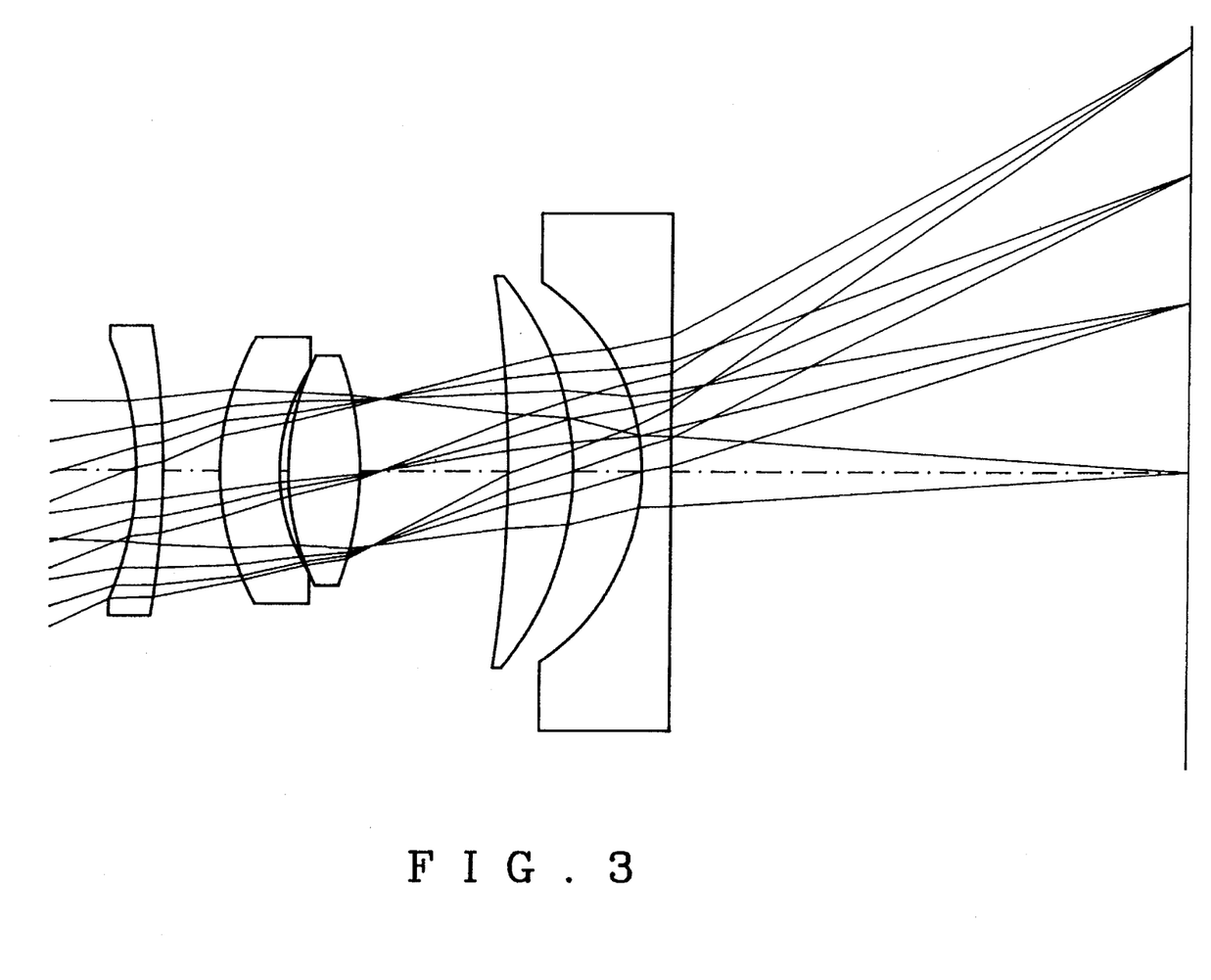
FIG. 3 is a schematic view illustrating refraction of rays through the lens system of the first embodiment of the present invention at intermediate focal length.
Figure 3A:
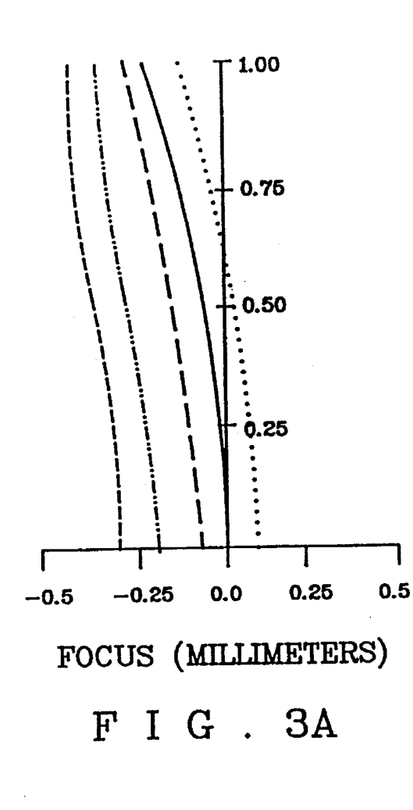
FIG. 3A shows the various longitudinal spherical aberrations of the lens system of FIG. 3.
Figure 3B:
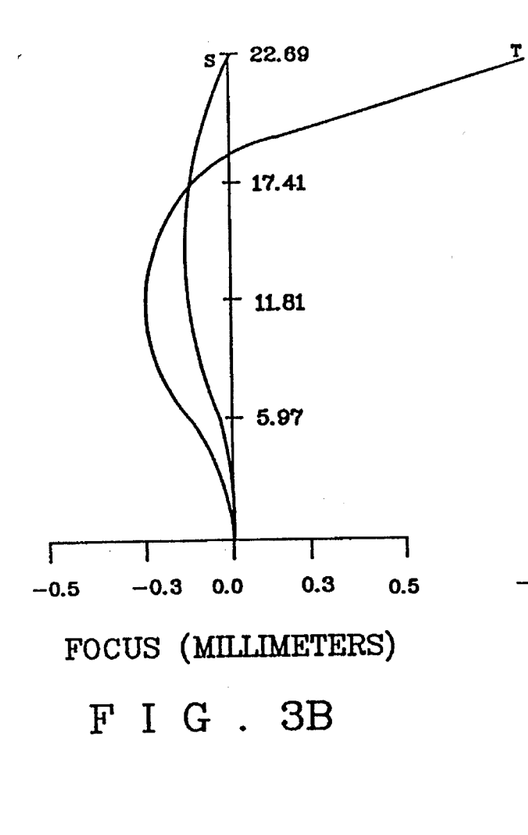
FIG. 3B shows the astigmatism and the field curvature of the lens system of FIG. 3.
Figure 3C:
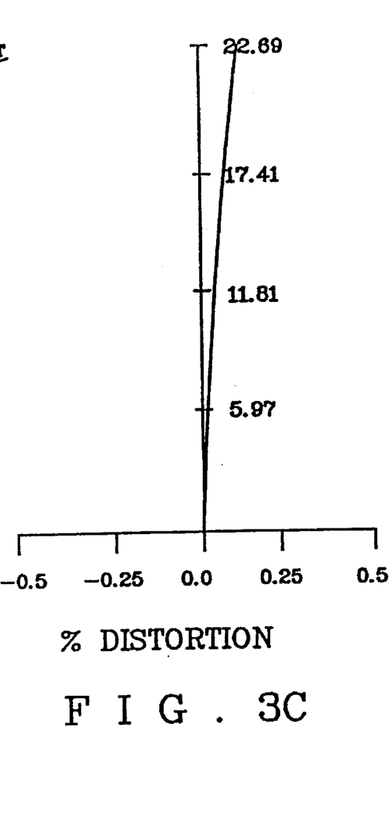
FIG. 3C shows the distortion of the lens system of FIG. 3.

FIG. 3 is a schematic view illustrating refraction of rays through the lens elements from the object side to the image side of the lens systems of the present invention at the intermediate focal length position. FIGS. 3A through 3C show the various aberrations of the lens system of FIG. 3 at the intermediate focal length position. FIG. 3A shows the longitudinal spherical aberrations of the lens system. FIG. 3B shows the astigmatism and the field curvature of the lens system. FIG. 3C shows the distortion of the lens system.

Figure 4:
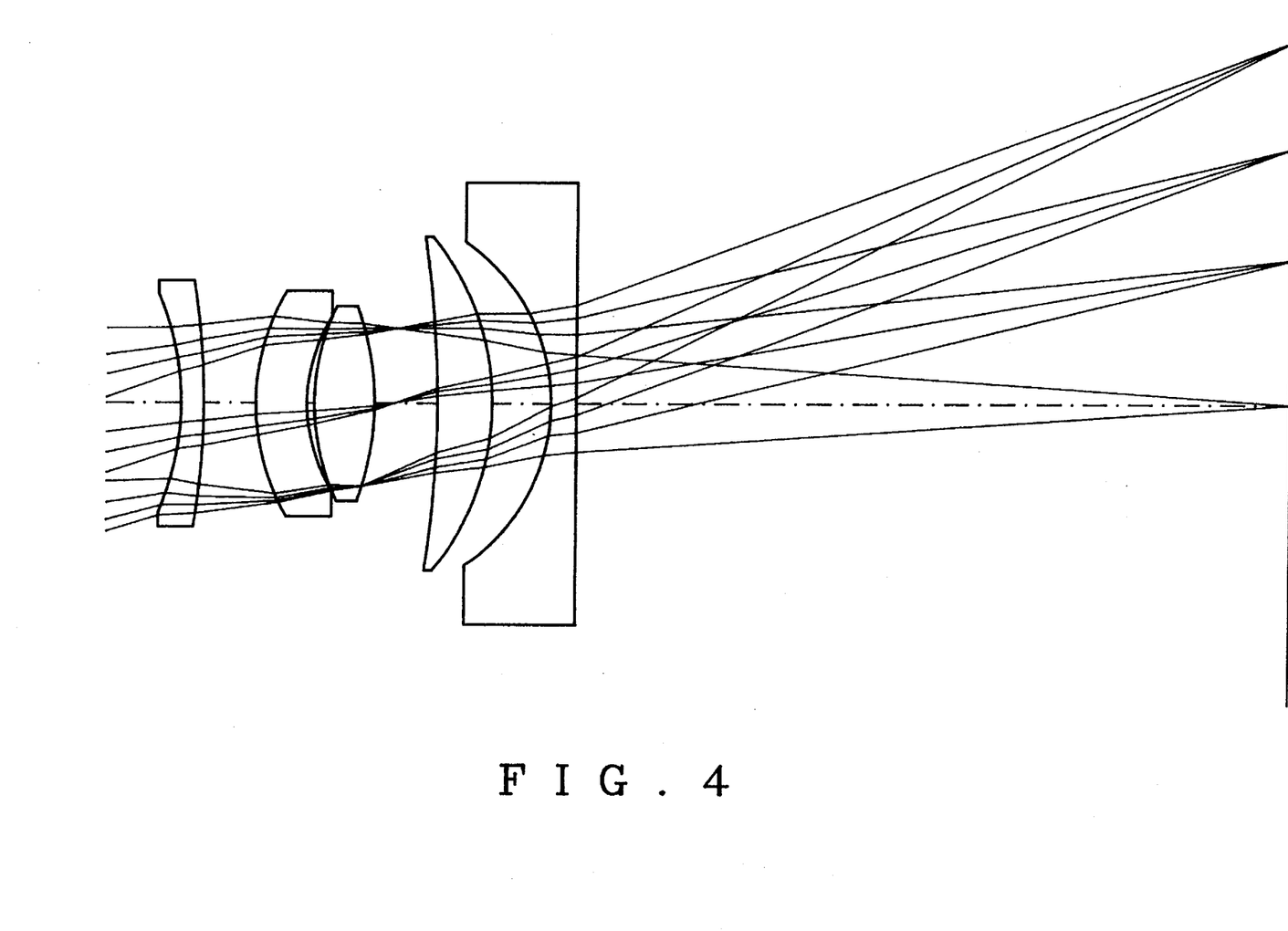
FIG. 4 is a schematic view illustrating refraction of rays through the lens system of the first embodiment of the present invention in telephoto position.
Figure 4A:
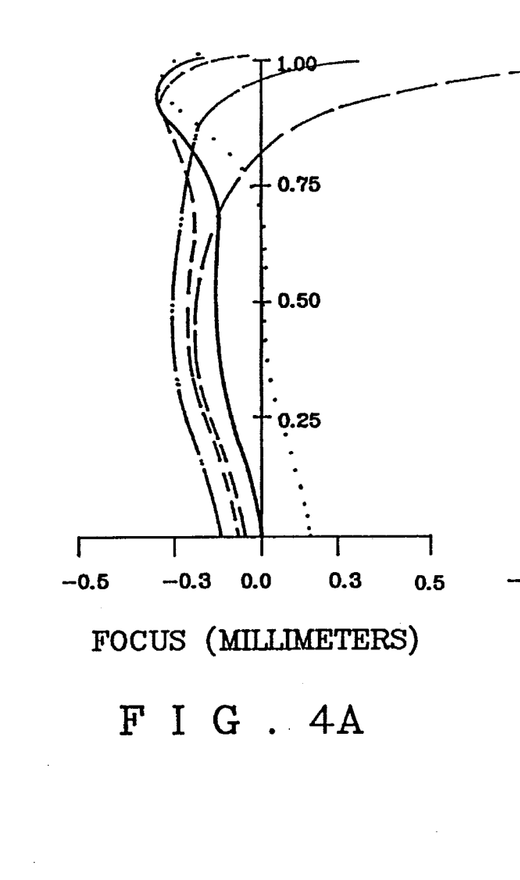
FIG. 4A shows the various longitudinal spherical aberrations of the lens system of FIG. 4.
Figures 4B, 4C:
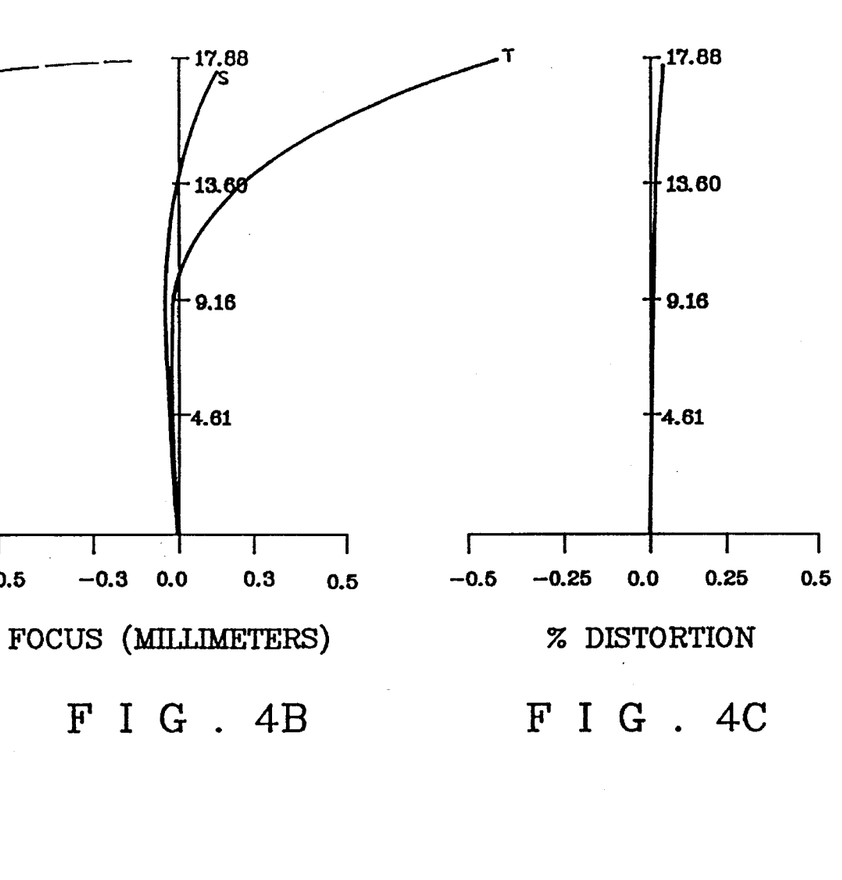
FIG. 4B shows the astigmatism and the field curvature of the lens system of FIG. 4.
FIG. 4C shows the distortion of the lens system of FIG. 4.

FIG. 4 is a schematic view illustrating refraction of rays through the lens elements from the object side to the image side of the lens systems of the present invention in the telephoto position. FIGS. 4A through 4C show the various aberrations of the lens system of FIG. 4 in the telephoto position. FIG. 4A shows the longitudinal spherical aberrations of the lens system. FIG. 4B shows the astigmatism and the field curvature of the lens system. FIG. 4C shows the distortion of the lens system.

In the preferred embodiment of the present invention, the front lens group of the lens system includes at least one aspheric lens. The rear lens group also includes at least one aspheric lens. The feature of the aspheric lens may be indicated by the following equation:

$$Z = \frac{CY^2}{1 + [1 - (1+k)Curv^2Y^2]^{1/2}} + AY^4 + BY^6 + CY^8 + DY^{10}$$

wherein:

Z represents the sag of the lens;

C represents the curvature of the lens;

K represents the Konic Constant; Y represents the height of the lens from the optical axis of the lens system;

A represents the 4th order deformation coefficient;

B represents the 6th order deformation coefficient;

C represents the 8th order deformation coefficient; and

D represents the 10th order deformation coefficient.

In the following data of preferred embodiment of the invention, symbol F represents the focal length of the zoom lens system, Di represents the thickness of respective lens along the optical axis. Ni represents the axis, refractive index of respective lens, and Vi represents the Abbe's number of respective lens.

|  | F = 36.5–67 | f/# = 5.6–7.41 |  |
| --- | --- | --- | --- |
| Ri | Di | Ni | Vi |
| R1 = −18.3341 | D1 = 1.4515 | N1 = 1.7552 | V1 = 27.5 |
| R2 = −45.4862 | D2 = 2.9899 |  |  |
| R3 = 10.59608 | D3 = 3.0 | N3 = 1.585 | V3 = 30.0 |
| R4 = 9.2175 | D4 = 0.674 |  |  |
| R5 = 15.1156 | D5 = 3.4 | N5 = 1.491 | V5 = 57.1 |
| R6 = −16.7952 | D6 = 13.12423 |  |  |
| R7 = −62.8335 | D7 = 3.446 | N7 = 1.491 | V7 = 57.1 |

-continued

| | F = 36.5–67 | f/# = 5.6–7.41 | |
|---|---|---|---|
| Ri | Di | Ni | Vi |
| R8 = −18.47548 | D8 = 3.5232 | | |
| R9 = −11.2346 | D9 = 1.4 | N9 = 1.62299 | V9 = 58.2 |
| R10 = Infinite | | | | wherein the D6 is a variable distance, and its relationship with various focal lengths is as follows:

| Focal Length Variable distance | 36.5 | 51.73 | 67 |
|---|---|---|---|
| D6 | 13.1242 | 7.4559 | 3.7993 |
| f/# | 5.67 | 7.18 | 7.41 |

In the preferred embodiment of the present invention, the lens surfaces R3, R5 and R8 are aspheric surface, and the aspheric coefficients (with reference to the equation of aspheric surface) of respective surface are as follows:

| The aspheric coefficient of the lens surface No.3 | A −4.00824E-5<br>C −3.50451E-8<br>K −0.254308 | B −5.17054E-7<br>D −6.26103E-11 |
|---|---|---|
| The aspheric coefficient of the lens surface No.5 | A 2.14148E-5<br>C 1.04688E-7<br>K −0.028111 | B 5.83767E-7<br>D −1.72681E-11 |
| The aspheric coefficient of the lens surface No.8 | A −5.71816E-6<br>C −8.20702E-9<br>K 1.968217 | B 4.30591E-7<br>D 5.38013E-11 |

Second Embodiment

Figure 5:
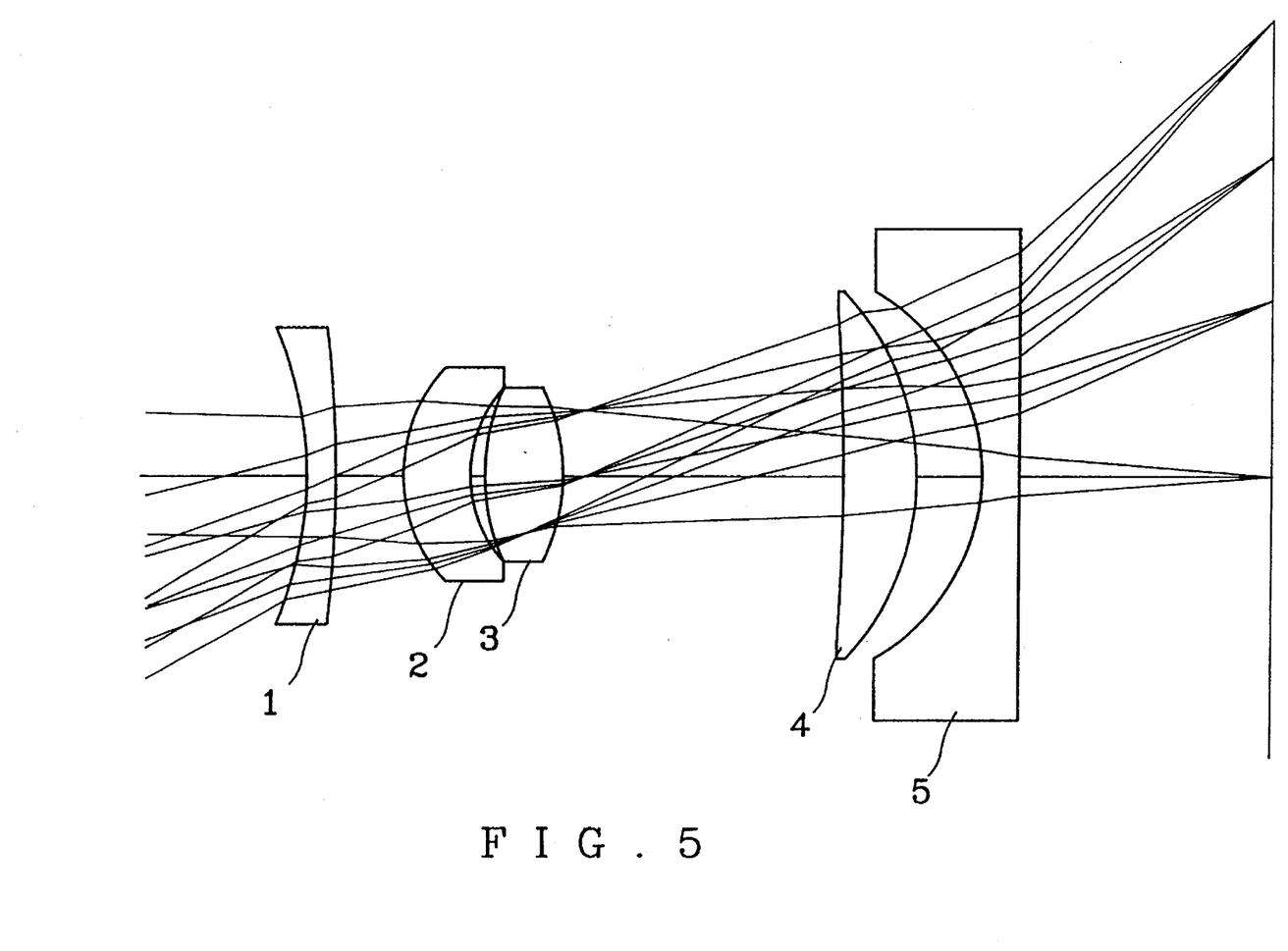
FIG. 5 is a schematic view illustrating refraction of rays through the lens system of the second embodiment of the present invention in wide-angle position.
Figure 5A:
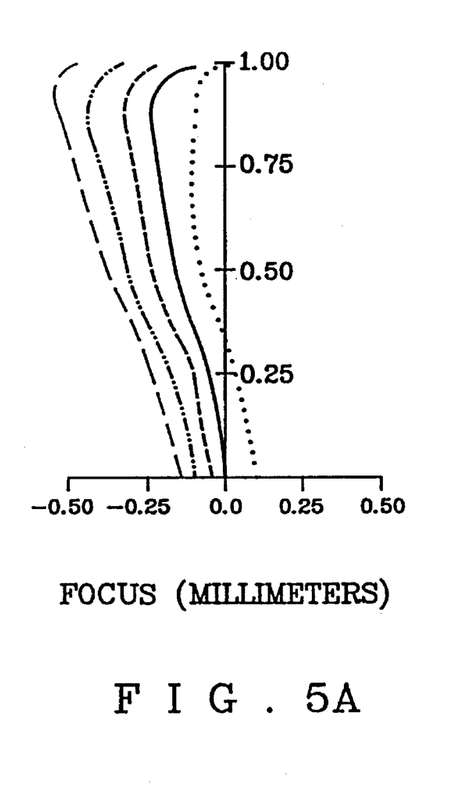
FIG. 5A shows the various longitudinal spherical aberrations of the lens system of FIG. 5.
Figure 5B:
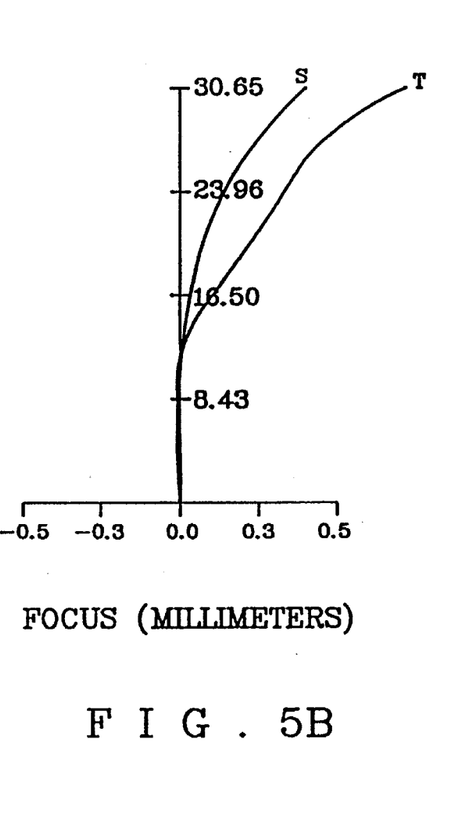
FIG. 5B shows the astigmatism and the field curvature of the lens system of FIG. 5.
Figure 5C:
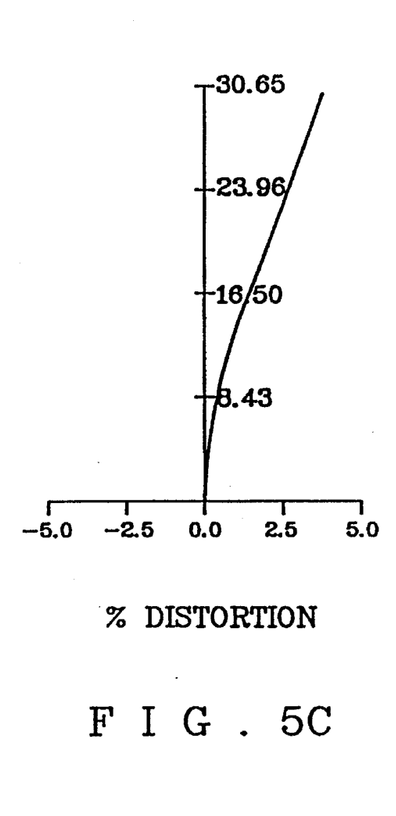
FIG. 5C shows the distortion of the lens system of FIG. 5.

FIG. 5 is a schematic view illustrating refraction of rays through the lens elements from the object side to the image side of the lens systems of the second embodiment of the present invention in wide-angle mode of operation. FIGS. 5A through 5C show the various aberrations of the lens system of FIG. 5 in wide-angle position. FIG. 5A shows the longitudinal spherical aberrations of the lens system. FIG. 5B shows the astigmatism and the field curvature of the lens system. FIG. 5C shows the distortion of the lens system.

Figure 6:
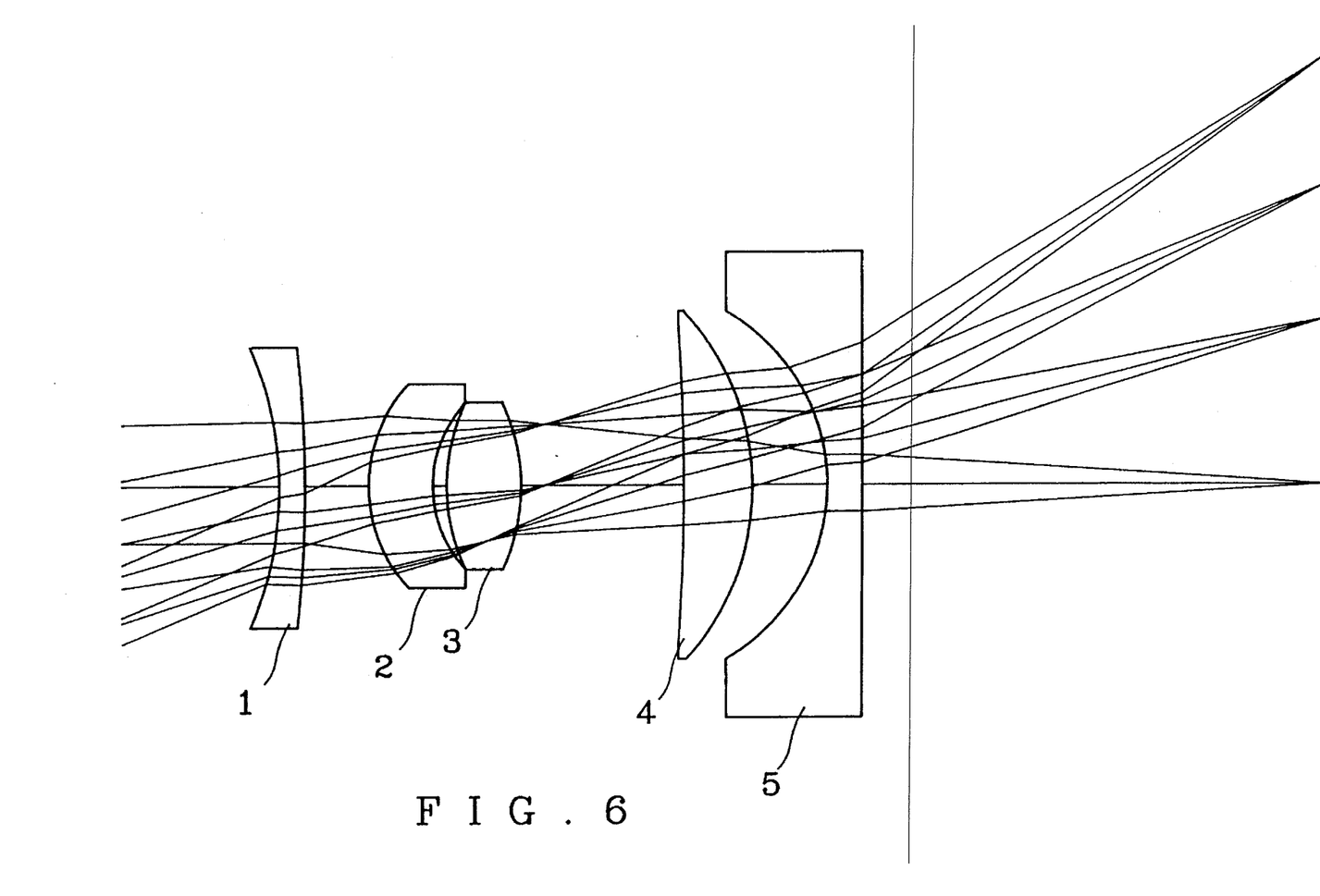
FIG. 6 is a schematic view illustrating refraction of rays through the lens system of the second embodiment of the present invention at intermediate focal length.
Figure 6A:
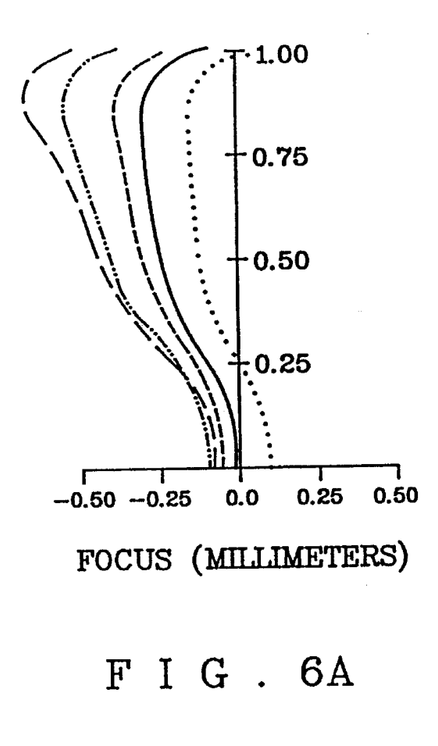
FIG. 6A shows the various longitudinal spherical aberrations of the lens system of FIG. 6.
Figure 6B:
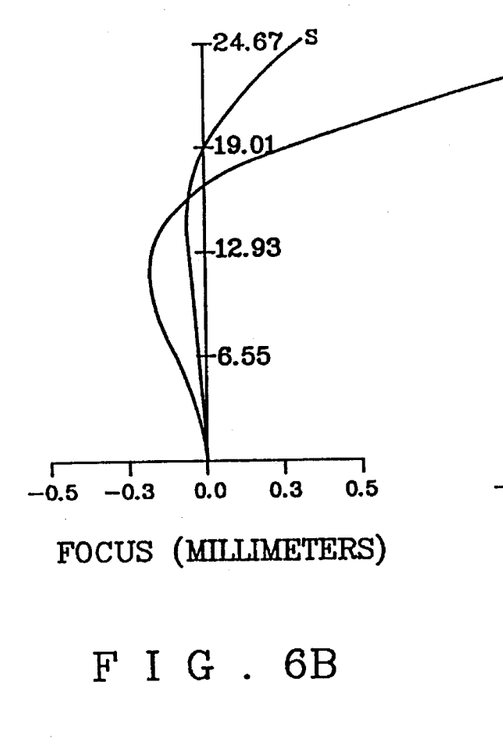
FIG. 6B shows the astigmatism and the field curvature of the lens system of FIG. 6.
Figure 6C:
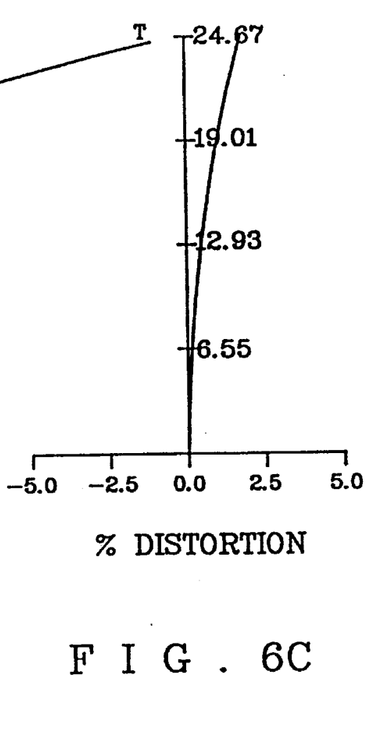
FIG. 6C shows the distortion of the lens system of FIG. 6.

FIG. 6 is a schematic view illustrating refraction of rays through the lens elements from the object side to the image side of the lens systems of the present invention at the intermediate focal length position. FIGS. 6A through 6C show the various aberrations of the lens system of FIG. 6 at the intermediate focal length position. FIG. 6A shows the longitudinal spherical aberrations of the lens system. FIG. 6B shows the astigmatism and the field curvature of the lens system. FIG. 6C shows the distortion of the lens system.

Figure 7:
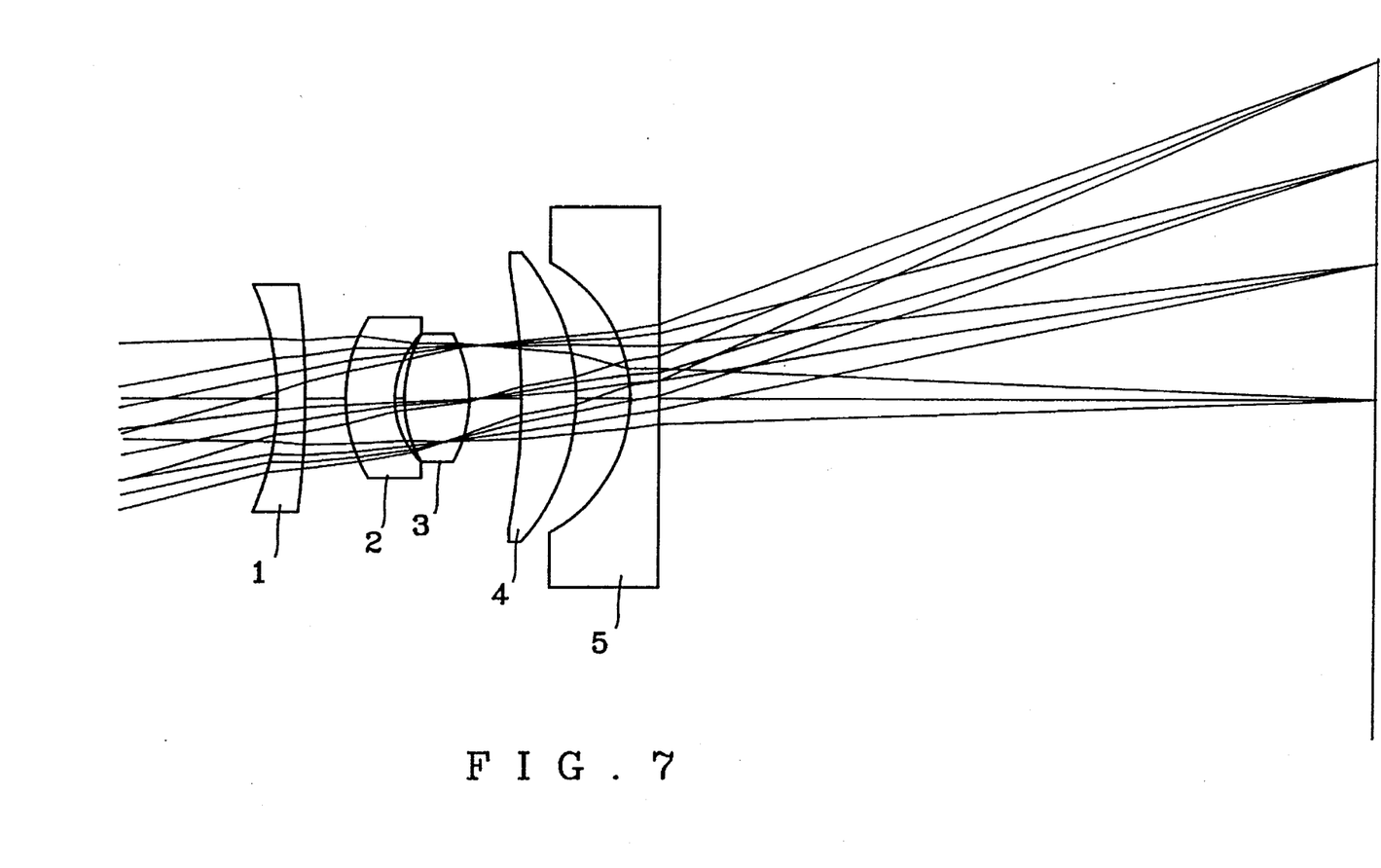
FIG. 7 is a schematic view illustrating refraction of rays through the lens system of the second embodiment of the present invention in telephoto position.
Figure 7A:
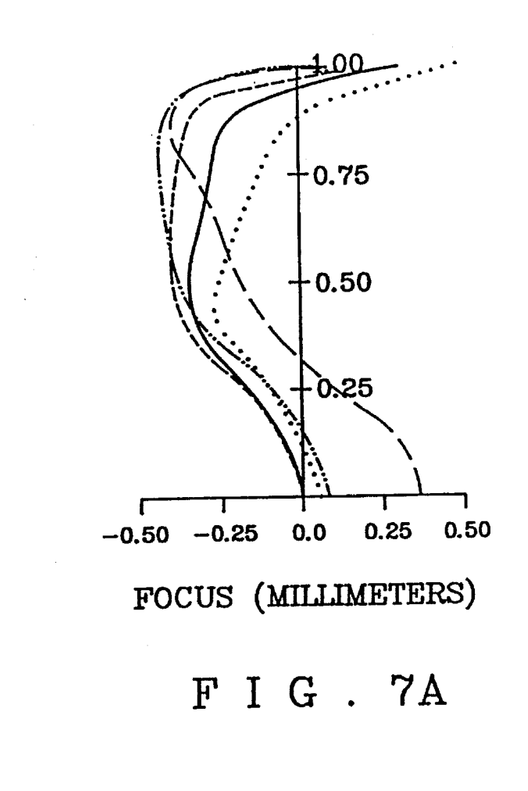
FIG. 7A shows the various longitudinal spherical aberrations of the lens system of FIG. 7.
Figures 7B, 7C:
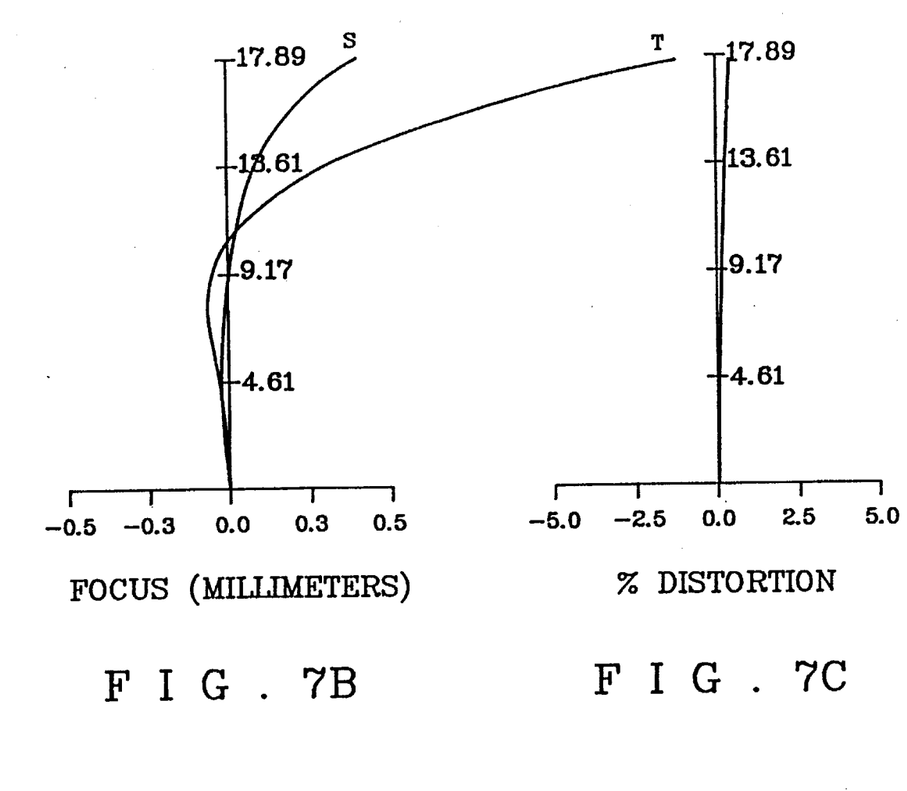
FIG. 7B shows the astigmatism and the field curvature of the lens system of FIG. 7.
FIG. 7C shows the distortion of the lens system of FIG. 7.

FIG. 7 is a schematic view illustrating refraction of rays through the lens elements from the object side to the image side of the lens systems of the present invention in the telephoto position. FIGS. 7A through 7C show the various aberrations of the lens system of FIG. 7 in the telephoto position. FIG. 7A shows the longitudinal spherical aberrations of the lens system. FIG. 7B shows the astigmatism and the field curvature of the lens system. FIG. 7C shows the distortion of the lens system.

In the second embodiment of the present invention, the front lens group of the lens system includes at least one aspheric lens. The rear lens group also includes at least one aspheric lens. The equation of the aspheric lens of this embodiment is the same as that in the first embodiment.

The following is the data of the second embodiment of the invention, in which symbol F represents the focal length of the zoom lens system, Di represents the thickness of respective lens along the optical axis, Ni represents the refractive index of respective lens, and Vi represents the Abbe's number of respective lens.

| | F = 36–67 | f/# = 6.08–11.167 | |
|---|---|---|---|
| Ri | Di | Ni | Vi |
| R1 = −17.28965 | D1 = 1.4 | N1 = 1.7552 | V1 = 27.5 |
| R2 = −60.33899 | D2 = 3.01137 | | |
| R3 = 9.06238 | D3 = 3.0 | N3 = 1.5855 | V3 = 30.0256 |
| R4 = 7.90708 | D4 = 0.468163 | | |
| R5 = 10.94986 | D5 = 3.330207 | N5 = 1.491 | V5 = 57.1744 |
| R6 = −19.75281 | D6 = 12.438381 | | |
| R7 = −68.87535 | D7 = 3.189951 | N7 = 1.491 | V7 = 57.1744 |
| R8 = −17.8818 | D8 = 3.285764 | | |
| R9 = −10.29119 | D9 = 1.4 | N9 = 1.62299 | V9 = 58.2 |
| R10 = Infinite | | | |

D6 is the variable distance, and its relationship with focal length is as follows:

| Focal Length Variable space | 36.5 | 47.1 | 67 |
|---|---|---|---|
| D6 | 12.4384 | 8.0138 | 3.4885 |
| f/# | 6.08 | 7.85 | 11.1667 |

In the second embodiment, the lens surfaces R5 and R8 are aspheric surfaces, and the surface coefficients of respective surfaces are as follows:

| The aspheric Coefficient of the lens surface R5 | A −1.47693E-5<br>C 7.87144E-7<br>K −0.906256 | B −7.99892E-6<br>D −3.07359E-8 |
|---|---|---|
| The aspheric coefficient of the lens surface R8 | A −5.3135E-6<br>C −1.00188E-8<br>K 2.407465 | B 3.64547E-7<br>D 9.54268E-11 |

The zoom lens system described above employs only five lens elements, which provides the features of a small outer diameter, short total length and few lens elements, and is particularly suitable for use in the 35 mm lens shutter camera. It will be obvious to those skilled in the art to use this invention according to the above detailed description. While the arrangement herein described constitutes a preferred embodiment of this invention, it is to be understood that various changes and modifications may be made therein without departing from the scope and spirit of the invention as defined in the appended claim.

I claim:

1. A camera zoom lens consisting of five lens elements arranged in two groups, the first three lens elements forming a front lens group with a positive refractive power and the last two lens elements forming a rear lens group with a negative refractive power, and an airspace reserved between the two groups being made variable to effect zooming, wherein, counting from an object side to an image side of the zoom lens system, said front lens group consisting of two negative lens elements and one positive lens element, and said rear lens group consisting of a positive lens element and a negative lens element.

2. A camera zoom lens as claimed in claim 1, wherein the first lens element is a negative lens element, the second lens element is a negative lens element, and the third lens element is a positive lens element.

3. A camera zoom lens as claimed in claim 1, wherein the first lens element in the front lens group has a negative refractive power and has its concave surface directed toward the object side of the lens system.

4. A camera zoom lens as claimed in claim 1, wherein the rear lens group comprises a positive lens element and a negative lens element, in which the positive lens element has its concave surface directed toward the object side of the lens system.

5. A camera zoom lens as claimed in claim 1, wherein the rear lens group comprises a positive lens element and a negative lens element, in which the negative lens element has its concave surface directed toward the object side of the lens system.

6. A camera zoom lens as claimed in claim 1, wherein the front group comprises at least an aspheric lens surface.

7. A camera zoom lens as claimed in claim 1, wherein the rear group comprises at least an aspheric lens surface.

8. A camera zoom lens as claimed in claim 1, wherein each of the front group and the rear group comprises at least an aspheric lens surface.

9. A camera zoom lens as claimed in claim 8, wherein the object side of the second lens element, the object side of the third lens element, and the image side of the fourth lens element all have an aspheric surface.

10. A camera zoom lens as claimed in claim 8, wherein the object side of the third lens element, and the image side of the fourth lens element both have an aspheric surface.

* * * * *